United States Patent [19]

Mueller et al.

[11] Patent Number: 5,097,077
[45] Date of Patent: Mar. 17, 1992

[54] PURIFICATION OF HETEROPOLYACID-CONTAINING POLYALKYLENE ETHER GLYCOLS

[75] Inventors: Herbert Mueller, Frankenthal; Gerhard Jeschek, Gruenstadt; Rolf Fischer, Heidelberg; Hans-Juergen Weyer, Mannheim, all of Fed. Rep. of Germany

[73] Assignee: BASF Aktiengesellschaft, Ludwigshafen, Fed. Rep. of Germany

[21] Appl. No.: 593,127

[22] Filed: Oct. 5, 1990

[30] Foreign Application Priority Data

Oct. 6, 1989 [DE] Fed. Rep. of Germany ....... 3933333

[51] Int. Cl.$^5$ ............................................. C07C 41/38
[52] U.S. Cl. .................................... 568/617; 568/621
[58] Field of Search ................................. 568/621, 617

[56] References Cited

U.S. PATENT DOCUMENTS 4,762,951  8/1988  Mueller ........................... 568/617
4,933,503  6/1990  Mueller ........................... 568/621

FOREIGN PATENT DOCUMENTS 0126471  11/1984  European Pat. Off. ........... 568/621
0181621   5/1986  European Pat. Off. .

*Primary Examiner*—Howard T. Mars
*Assistant Examiner*—Kimberly J. Kestler
*Attorney, Agent, or Firm*—John H. Shurtleff

[57] ABSTRACT

A process is described for the purification of crude polyalkylene ether glycols contaminated by heteropolyacids or salts thereof, by treatment with solvents, which comprises mixing the crude polyalkylene ether glycols with a liquid hydrocarbon and water, allowing the phases to separate, and isolating the purified polyalkylene ether glycols from the upper phase.

10 Claims, No Drawings

PURIFICATION OF HETEROPOLYACID-CONTAINING POLYALKYLENE ETHER GLYCOLS

The present invention relates to a process for the purification of heteropolyacid-contaminated polyalkylene ether glycols, as obtained, for example, by polymerization of tetrahydrofuran on heteropolyacids. The novel process facilitates substantial removal and recovery of the heteropolyacids and isolation of polyalkylene ether glycols in high purity.

Polyalkylene ether glycols, such as polyoxytetramethylene glycols (abbreviated to PTMG below), in particular polytetrahydrofuran (abbreviated to PTHF below), are important starting materials for the production of elastic fibers, elastic construction materials and coatings. They are produced by polymerizing tetrahydrofuran (abbreviated to THF below) or copolymerizing THF with oxiranes, such as ethylene oxide or propylene oxide, in the presence of cationic catalysts. In EP-A-0 126 471, the catalysts used are heteropolyacids. In this process the majority of the catalyst is successfully recovered after the reaction by simple phase separation and recycled into the reaction. However, a not insignificant proportion of the catalyst remains dissolved in the polymer solution after separation. Reasons of cost and also the required purity of the PTMG dictate that it must be removed completely.

EP-A-0 181 621 describes a process for the purification of heteropolyacid-contaminated PTMG solutions. In this multistage process, the PTMG solutions in THF obtained primarily in the polymerization of THF and containing, for example, 23% by weight of PTMG are concentrated to about 50% by weight of PTMG in the first stage by removing unreacted THF by distillation. A considerable amount of a hydrocarbon is then added, the components are mixed thoroughly, and the mixture is allowed to separate into two phases over 30 hours. The lower phase comprises 50% by weight of the heteropolyacid, and the remainder comprises PTMG, THF and traces of the hydrocarbon. Unreacted THF is removed by distillation from the upper phase, which contains the majority of the PTMG. The hydrocarbon/PTMG mixture which remains again separates into two phases on cooling. A hydrocarbon phase and a PTMG phase containing dissolved hydrocarbon are obtained. If the hydrocarbon is removed from the PTMG-containing phase by distillation, a PTMG which still contains 50 ppm of heteropolyacid is finally produced. Since this content of the highly acidic compound cannot be tolerated in the PTMG, the concentration of the heteropolyacid is reduced in a further operation by re-dissolving the PTMG in a hydrocarbon, and treating the solution with an adsorbent, such as calcium oxide, magnesium oxide, aluminum oxide, activated charcoal or an active alumina. This process is thus very inconvenient. However, it is also very expensive, since 100% removal of the catalyst from the polymer requires evaporation of about four times the amount of hydrocarbon after the purification operations (see Examples 1 and 15 in EP-A-0 181 621). On page 3, lines 6 to 24, of said patent application, it is pointed out that the removal of heteropolyacids from the polymers by extraction with water or filtration or by washing out the neutralized salts cannot be carried out economically.

Since the polymerization of THF using heteropolyacids gives polyalkylene ether glycols which are highly suitable for the production of elastic fibers and have an advantageously narrow molecular weight distribution, it was an object of the present invention to find a process which allows the heteropolyacids to be effectively removed from crude PTMG by a simple route. The novel process should, in particular, allow a sufficiently high throughput, have the capacity for being carried out continuously, and be energy efficient.

We have found that this object is achieved by carrying out the purification of crude polyalkylene ether glycols contaminated by heteropolyacids or salts thereof using solvents by mixing the crude polyalkylene ether glycols with a liquid hydrocarbon and water, allowing the phases to separate, and isolating the purified polyalkylene ether glycols from the upper phase.

In the novel process, which substantially achieves said object, the heteropolyacid is removed virtually completely from the crude PTMG in one separation step.

For the purposes of the invention, crude PTMG contaminated by heteropolyacids or salts thereof refers to polymers obtained by conventional methods, as described, for example, in EP-A-0 126 471, by polymerizing THF or copolymerizing THF with oxiranes in the presence of heteropolyacids. This crude PTMG is formed during the preparation as a liquid mixture containing unreacted THF and the catalysts. Mixtures of this type, which, in this form, can be subjected directly to the purification process of the invention, contain from 5 to 60% by weight, preferably from 5 to 45% by weight, in particular from 10 to 40% by weight, of PTMG, from 94.99 to 39.99% by weight, preferably from 94.99 to 54.99% by weight, in particular from 89.90 to 59.90% by weight, of THF and from 0.01 to 6% by weight, preferably from 0.1 to 4% by weight, of heteropolyacids or salts thereof.

Heteropolyacids and their acidic salts which can be separated from the crude PTMG by the process according to the invention are inorganic heteropolyacids containing, in contrast to isopolyacids, at least two different central atoms. Heteropolyacids are formed from in each case weak, polybasic oxygen acids of a metal, such as chromium, molybdenum, vanadium and tungsten, and a nonmetal such as arsenic, iodine, phosphorus, selenium, silicon, boron and tellurium, as partial mixed anhydrides. Specific examples are dodecatungstophosphoric acid $H_3[PW_{12}O_{40}]$ and dodecamolybdophosphoric acid $H_3[PMo_{12}O_{40}]$. Heteropolyacids may also contain actinoids or lanthanoids as the second central atom. The heteropolyacids may generally be described by means of the formula $H_{8-n}(Y_nM_{12}O_{40})$ where n is the valency of the element Y (for example boron, silicon or zinc). Preferred heteropolyacids for the preparation of PTMG are phosphomolybdic acid, phosphotungstic acid, silicomolybdic acid and silicotungstic acid.

Examples of liquid hydrocarbons used are saturated or unsaturated aliphatic or cycloaliphatic hydrocarbons having from 5 to 10 carbon atoms, or aromatic hydrocarbons having from 6 to 10 carbon atoms, such as pentane, cyclopentane, hexane, heptane, methylcyclohexane, octane, decane, cyclohexane, cyclooctane, benzene, toluene, xylene, diethylbenzene and naphthalene, of which cyclopentane, cyclohexane and methylcyclohexane are preferred. Based on the weight of PTMG, the amount of the hydrocarbon used is, for example, from 0.2 to 5 times, in particular from 0.5 to 2 times, and the amount of water used is from 0.03 to 2 times, in particular from 0.1 to 1 times. If starting mixtures having relatively high contents of THF are used, the amount of water required is in the upper part of the range, in each case at least sufficient water being added so that a lower, water-containing layer forms on phase separation.

The crude PTMG is expediently mixed with the hydrocarbon and water at from 5° to 60° C., preferably at from 10° to 45° C. The phase separation can be carried out in said temperature range.

Surprisingly, the mixture separates into 2 or 3 phases after mixing. The lower phases each contain, depending on the mixing ratio of hydrocarbon and water, up to 99% by weight of the heteropolyacid present in the crude PTMG. The lowermost phase, if formed, is virtually pure water-containing heteropolyacid. The middle phase contains water, a small amount of THF and cyclohexane, and heteropolyacid. The upper, lightest phase essentially comprises cyclohexane, PTMG and the unreacted THF. It contains only traces of the acids. The lower, water-containing phase, which contains the heteropolyacids, can be re-used for polymerization without further treatment after separation. The THF can be recovered from the middle, water-containing phase by distillation. However, the middle phase is advantageously employed directly for the purification process according to the invention. In this case, there is no need to add water. The upper phase contains the PTMG essentially freed of the heteropolyacid. Traces of the acids which are still present therein are neutralized by mixing with a base, such as from 1 to 50% strength sodium hydroxide solution or potassium hydroxide solution. The PTMG is subsequently separated from the solution mixture, for example in a film evaporator under atmospheric pressure or under reduced pressure. Final filtration of the polymer gives a PTMG having a very high quality standard, since it is free of impurities and has a very narrow molecular weight distribution. The solvents produced on evaporation can be separated off and purified by known physical methods, for example by distillation. They can be re-used without any limitations; the recovered THF for further polymerization, the hydrocarbon and the water for use in the process according to the invention. If only small amounts of water are added in the process according to the invention, only two phases are formed after mixing. Work-up of the phases, of which the upper is virtually acid-free and the lower, water-containing phase contains the heteropolyacid, is carried out analogously.

In the examples, parts and percentages are by weight.

EXAMPLE a) Polymerization of THF to give PTHF

A solution of 11 parts of water and 300 parts of THF (water content 0.011%) is added carefully over the course of 1 hour at below 40° C. to 400 parts of phosphotungstic acid $H_3[PW_{12}O_{40}]$, from which the water has been removed at 150° and 0.1 mbar. The mixture of acid, water and THF is stirred vigorously at 60° C. for 6 hours. The reaction mixture is left to stand, forming two phases, which are separated from one another. The upper phase contains some of the PTHF formed. The upper phase totals 24 parts, and contains 5 parts of PTHF having a molecular weight of 2,830 and a polydispersity $M_w:M_n=1.5$, the remainder being THF and about 1 part of heteropolyacid. The lower phase contains, in addition to the monomer (THF) and PTMG, about 399 parts of heteropolyacid. Since, in this first batch, a PTHF of constant molecular weight is not obtained during the polymerization, further batches are prepared, in each case stirring 300 parts of THF with 2.7 parts of water and the heteropolyacids recovered from the preceding batch, in each case for 4 hours at 60° C. The lower, catalyst-containing phases are then separated, as described above, from the upper, PTHF- and THF-containing phase.

After the sixth batch, a PTHF of constant molecular weight is obtained during the polymerization. This and further batches each give from 295 to 300 parts of a crude PTHF solution, separated from the catalyst phase, having the following composition: 38% by weight of PTHF, 58.6% by weight of THF, 3.2% by weight of phosphotungstic acid and 0.2% by weight of water.

b) Purification of the crude PTHF 395 parts of the crude PTHF solution obtained as described in a) are stirred at 25° C. with 240 parts of cyclohexane and 28 parts of water. The mixture then separates into 3 phases. About 600 parts of the upper phase are obtained, which are composed of 249 parts of THF, 122 parts of PTHF and about 220 parts of cyclohexane. The heteropolyacid content is <30 ppm. The middle phase comprises 25 parts of water, 9 parts of THF, 5 parts of cyclohexane and 4.6 parts of the heteropolyacid. It is supplemented by 3 parts of water and employed for the purification operations of the next reaction batch. The lower phase, a total of 6.3 parts, comprises 80% by weight of phosphotungstic acid, the remainder being water. Since the water content is only 20%, it can be recycled in this form directly into the catalyst phase of the polymerization step, taking into account in the subsequent polymerization batch the water thereby added.

The upper phase, which contains substantially purified PTHF, is freed from acidic constituents which remain by adding 10 parts by weight of 10% strength sodium hydroxide solution and thoroughly mixing the components.

The resultant solution is evaporated on a rotary evaporator, giving 122 parts of PTHF. In order to remove the base used for the neutralization, which is in suspended form, the mixture is filtered through a Seitz sheet filter to give high purity PTHF of molecular weight 2,040 and polydispersity $M_w:M_n$ of 1.5.

Similar results are obtained if the heteropolyacid $H_4SiMo_{12}O_{40}$ or $H_4SiW_{12}O_{40}$ is used as the catalyst in the polymerization. However, the polymerization rate in this case is only about 60% of that described above, and the conversion of tetrahydrofuran achieved is only 20%.

We claim:

1. In a process for the purification of a crude polyalkylene ether glycol contaminated by one or more heteropolyacids or salts thereof, the improvement which comprises:

mixing said crude polyalkylene ether glycol with a liquid hydrocarbon and water, allowing the mixture to stand for a period of time sufficient to form two or three phases, and then separating phases from each other and isolating the purified polyalkylene ether glycol from the uppermost phase.

2. A process as claimed in claim 1, wherein said crude polyalkylene ether is that obtained by polymerizing tetrahydrofuran or by copolymerizing tetrahydrofuran with an oxirane in the presence of one or more heteropolyacids or salts thereof.

3. A process as claimed in claim 1, wherein said crude polyalkylene ether glycol is a mixture containing from 5 to 60% by weight of polyalkylene ether glycol, from 94.99 to 39.99% by weight of tetrahydrofuran and from 0.01 to 6% by weight of heteropolyacids or salts thereof.

4. A process as claimed in claim 1, wherein, based on the weight of said polyalkylene ether glycol, from 0.2 to 5 times the amount of the hydrocarbon and from 0.03 to 2 times the amount of water are used.

5. A process as claimed in claim 1, wherein the hydrocarbon used is cyclohexane, cyclopentane or methyl cyclohexane.

6. A process as claimed in claim 1, wherein the water- and heteropolyacid-containing lower phase obtained on phase separation is recovered and used for the polymerization of tetrahydrofuran.

7. A process as claimed in claim 1, wherein the water-, heteropolyacid- and tetrahydrofuran-containing lower phases obtained on phase separation are partially or fully freed from tetrahydrofuran and water by distillation and used for the polymerization of tetrahydrofuran.

8. A process as claimed in claim 1, wherein the water- and hydrocarbon-containing middle phase obtained on phase separation is used for the solvent treatment of the crude polyalkylene ether glycol.

9. A process as claimed in claim 1, wherein the crude glycol, liquid hydrocarbon and water are initially mixed at a temperature of 5° to 60° C. and the phase formation and separation is carried out in the same temperature range.

10. A process as claimed in claim 9, wherein the mixing, phase formation and separation is carried out at a temperature of 10° to 45° C.

* * * * *